United States Patent

Sato

(10) Patent No.: US 8,768,164 B2
(45) Date of Patent: Jul. 1, 2014

(54) OPTICAL TRANSMITTER AND OPTICAL TRANSMISSION METHOD

(75) Inventor: Mitsuru Sato, Paderborn (DE)

(73) Assignee: Fujitsu Limited, Kawasaki (JP)

( * ) Notice: Subject to any disclaimer, the term of this patent is extended or adjusted under 35 U.S.C. 154(b) by 158 days.

(21) Appl. No.: 13/609,332

(22) Filed: Sep. 11, 2012

(65) Prior Publication Data

US 2013/0121688 A1    May 16, 2013

(30) Foreign Application Priority Data

Nov. 14, 2011   (JP) ................... 2011-249136

(51) Int. Cl.
    *H04B 10/08*   (2006.01)
    *H04B 17/00*   (2006.01)

(52) U.S. Cl.
    USPC .............................. 398/25; 398/23

(58) Field of Classification Search
    USPC .......................... 398/2, 17, 22–27
    See application file for complete search history.

(56) References Cited

U.S. PATENT DOCUMENTS

| | | | | |
|---|---|---|---|---|
| 5,299,293 | A | * | 3/1994 | Mestdagh et al. ............... 398/24 |
| 5,539,564 | A | * | 7/1996 | Kumozaki et al. ................ 398/2 |
| 6,563,613 | B1 | * | 5/2003 | Tochio ............................ 398/25 |

FOREIGN PATENT DOCUMENTS

| JP | 2003-008136 A1 | 1/2003 |
|---|---|---|
| JP | 2006-067413 A1 | 3/2006 |

\* cited by examiner

*Primary Examiner* — Dalzid Singh
(74) *Attorney, Agent, or Firm* — Fujitsu Patent Center

(57) ABSTRACT

An optical transmitter includes a plurality of VCSELs (vertical cavity surface emitting laser) that convert an electrical signal into an optical signal and transmit the converted optical signal. The optical transmitter measures a time for each of the VCSELs of transmitting an optical signal. Then, the optical transmitter assigns an electrical signal, indicating information to be transmitted, to one or more VCSELs, out of the VCSELs, other than a VCSEL of which a cumulative time measured is more than a predetermined threshold.

9 Claims, 6 Drawing Sheets

| PACKAGE INFORMATION | ELEMENT INFORMATION | CUMULATIVE OPERATING TIME |
|---|---|---|
| 1 | 1 | 6 |
| | 2 | 5 |
| | 3 | 5 |
| | 4 | 5 |
| 2 | 1 | 1 |
| | 2 | 2 |
| | 3 | 0 |
| | 4 | 0 |

OPTICAL TRANSMITTER AND OPTICAL TRANSMISSION METHOD

CROSS-REFERENCE TO RELATED APPLICATION

This application is based upon and claims the benefit of priority of the prior Japanese Patent Application No. 2011-249136, filed on Nov. 14, 2011, the entire contents of which are incorporated herein by reference.

FIELD

The embodiments discussed herein are directed to an optical transmitter and an optical transmission method.

BACKGROUND

Conventionally, to improve a communication distance, communication speed, and signal density in a server, there has been developed an optical interconnect technology for relaying communication in the server by use of an optical signal. For example, a server to which the optical interconnect technology is applied includes a unit that converts an electrical signal into an optical signal or vice versa. Such a unit that converts an electrical signal into an optical signal or vice versa converts an electrical signal indicating data to be transmitted or received into an optical signal and transmits or receives the optical signal, thereby relaying communication in the server.

As the server to which the optical interconnect technology is applied includes the unit that converts an electrical signal into an optical signal or vice versa, the number of components in the server is larger than that of a server that performs communication using an electrical signal, which results in an increase in cost. Furthermore, the unit that converts an electrical signal into an optical signal or vice versa has lower reliability than a unit using an electrical signal only. Therefore, to increase the reliability of the unit that converts an electrical signal into an optical signal or vice versa to use the converted signal in communication in the server, cost increases.

Meanwhile, there is known a technology to use an inexpensive optical device in a unit that outputs an optical signal in order to achieve the optical interconnect technology at low cost. For example, there is known a technology to apply the optical interconnect technology to a device for consumers at low cost by using a vertical cavity surface emitting laser (VCSEL) as the optical device.

Patent document 1: Japanese Laid-open Patent Publication No. 2006-067413

Patent document 2: Japanese Laid-open Patent Publication No. 2003-008136

However, the technology of optical interconnect for a consumer device, using the optical device of which the reliability is low, cannot be applied to optical interconnect for servers.

For example, a continuous operating time of a VCSEL employed in the consumer optical interconnect is set to be short; therefore, if the VCSEL is installed in a server operating around the clock, the VCSEL reaches the limitation on the operating time in a short time. Furthermore, laser output of the VCSEL employed in the consumer optical interconnect is set to high output so as to cope with a harsh environment; therefore, the progression of time-related deterioration is fast. In this manner, the VCSEL employed in the consumer optical interconnect has low reliability and therefore cannot be employed in optical interconnect for servers.

SUMMARY

According to an aspect of the embodiments, an optical transmitter includes a plurality of transmitting units that convert an electrical signal into an optical signal and transmit the converted optical signal; a measuring unit that measures a time for each of the plurality of transmitting units of transmitting an optical signal; and an assigning unit that assigns an electrical signal, indicating information to be transmitted, to one or more transmitting units, out of the plurality of transmitting units, other than a transmitting unit of which a cumulative time measured by the measuring unit is more than a predetermined threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings.

[a] First Embodiment

Figure 1:
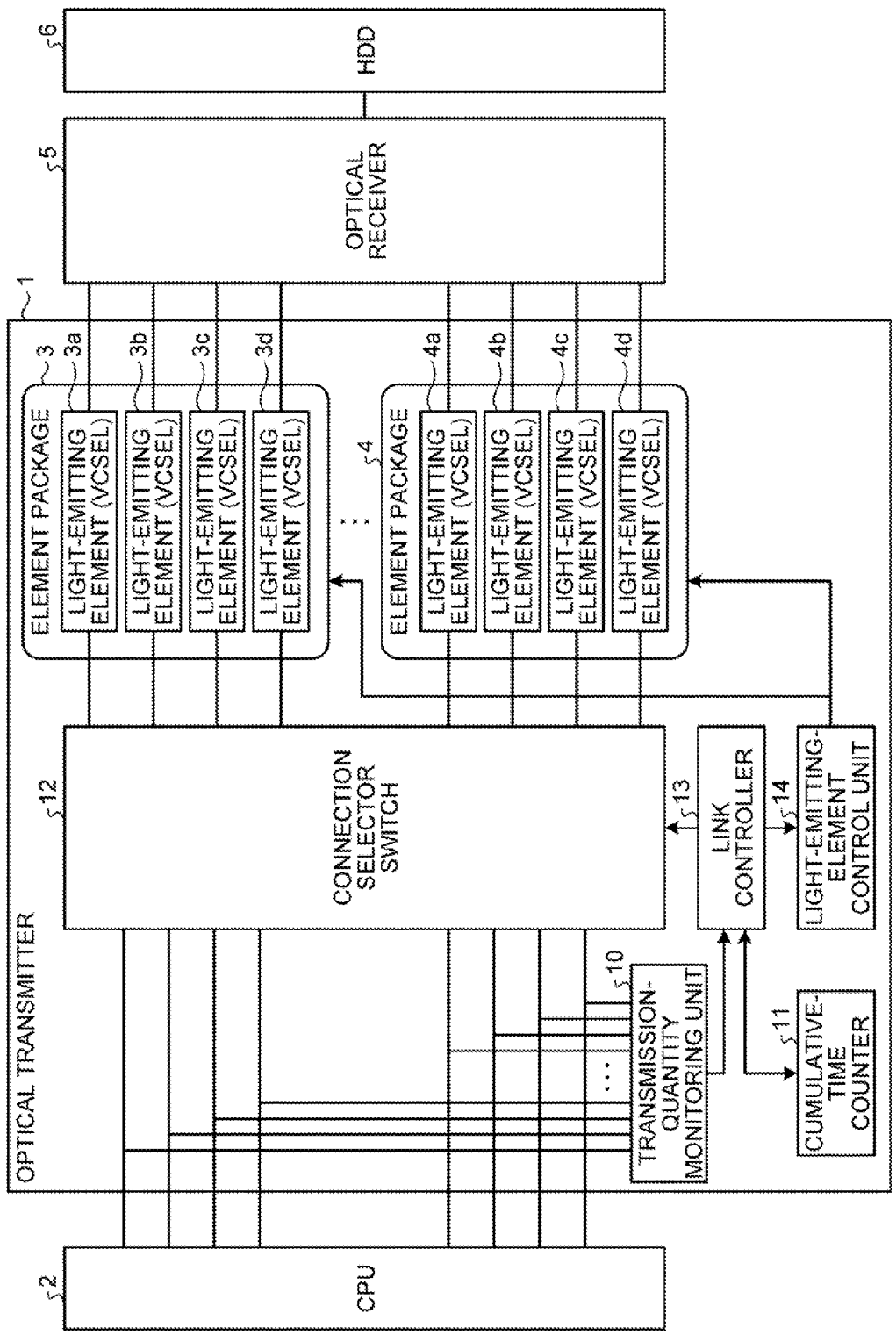
FIG. 1 is a diagram for explaining a functional configuration of an optical transmitter according to a first embodiment.

In a first embodiment described below, an example of an optical transmitter is explained with reference to FIG. 1. FIG. 1 is a diagram for explaining a functional configuration of the optical transmitter according to the first embodiment. As illustrated in FIG. 1, an optical transmitter 1 is connected to a central processing unit (CPU) 2 and an optical receiver 5. Furthermore, the optical receiver 5 is connected to a hard disk drive (HDD) 6.

Incidentally, although not illustrated in the diagram, the units 1 to 6 are installed in a server, and the optical receiver 5 can be connected to another device that the server includes. Furthermore, in the description below, there is provided an example where the optical transmitter 1 and the optical receiver 5 relay communication between the CPU 2 and the HDD 6.

In the example illustrated in FIG. 1, the optical transmitter 1 includes an element package 3, an element package 4, a transmission-quantity monitoring unit 10, a cumulative-time counter 11, a connection selector switch 12, a link controller 13, and a light-emitting-element control unit 14. Incidentally, in the example illustrated in FIG. 1, the optical transmitter 1 includes a plurality of element packages in addition to the element packages 3 and 4.

The optical transmitter 1 is connected to the CPU 2 via a plurality of electrical circuits, and acquires an electrical signal indicating information output from the CPU 2 via the plurality of electrical circuits. Furthermore, the optical transmitter 1 is connected to the optical receiver 5 via a plurality of optical links, and transmits information converted into an optical signal to the optical receiver 5 via the plurality of optical links. Incidentally, the CPU 2 identifies the plurality of optical links as one transmission line logically.

In this environment, the optical receiver 5 receives the optical signal, and converts the received optical signal into an electrical signal and transmits the converted electrical signal to the HDD 6. The HDD 6 stores therein information indicated by the electrical signal received from the optical receiver 5.

Subsequently, the element packages 3 and 4 included in the optical transmitter 1 are explained. The element package 3 includes vertical cavity surface emitting lasers (VCSELs) 3a to 3d which are light-emitting elements. The element package 4 includes VCSELs 4a to 4d. Incidentally, in the explanation below, the element package 4 performs the same function as the element package 3, and description of the element package 4 is omitted. Furthermore, although not illustrated in FIG. 1, the element packages 3 and 4 can include a PD that receives an optical signal from the optical receiver 5 via the optical links and converts the received optical signal into an electrical signal.

The element package 3 is a replaceable package; when any of the VCSELs 3a to 3d broke down, the VCSEL can be replaced with a new one. The VCSELs 3a to 3d convert an input electrical signal into an optical signal, and transmit the optical signal to the optical receiver 5 via the connected optical links. Incidentally, inexpensive VCSELs for a consumer device may be used as the VCSELs 3a to 3d, and the VCSELs 3a to 3d do not have to have such reliability as for a server.

The transmission-quantity monitoring unit 10 detects a transmission quantity of information to be transmitted from the CPU 2 to the HDD 6. For example, the transmission-quantity monitoring unit 10 acquires an electrical signal indicating information output from the CPU 2, and measures a transmission quantity of the information to be transmitted from the CPU 2 to the HDD 6. Then, the transmission-quantity monitoring unit 10 notifies the link controller 13 of the measured transmission quantity.

The cumulative-time counter 11 is a counter for counting a time when each of the VCSELs 3a to 3d and 4a to 4d has output an optical signal. Specifically, the cumulative-time counter 11 stores therein the number of times each of the VCSELs 3a to 3d and 4a to 4d has output an optical signal. Then, when receiving a notification of a VCSEL that has output an optical signal from the link controller 13, the cumulative-time counter 11 increments the number of times the notified VCSEL has output an optical signal by one.

Figures 2, 3:
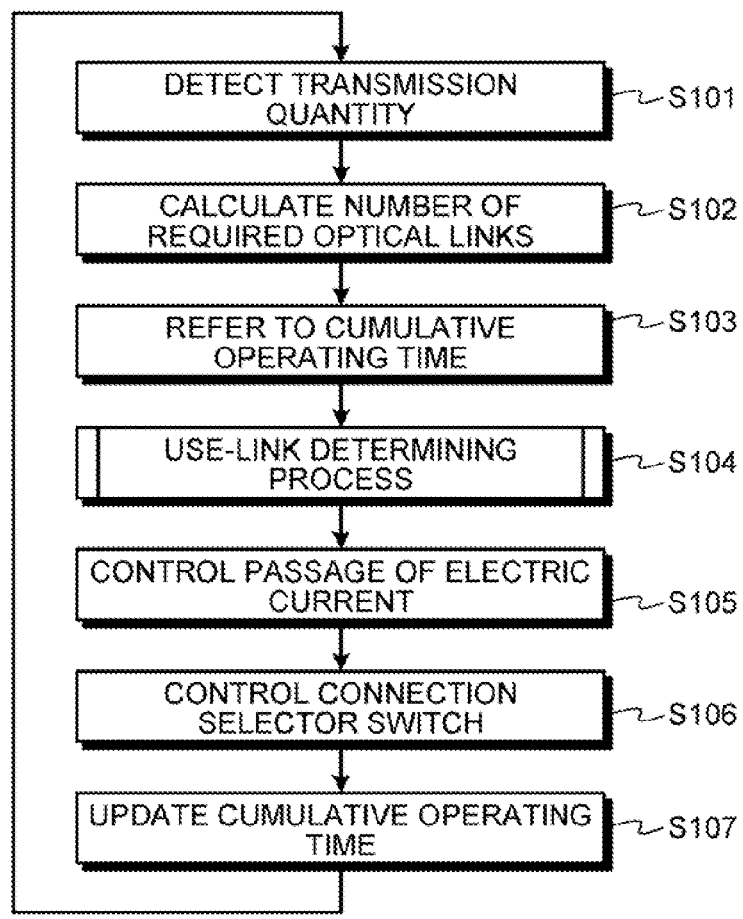
FIG. 2 is a diagram for explaining an example of a time to measure.
FIG. 3 is a flowchart for explaining the flow of a process performed by the optical transmitter according to the first embodiment.

For example, the cumulative-time counter 11 stores therein information illustrated in FIG. 2. FIG. 2 is a diagram for explaining an example of a time to measure. In the example illustrated in FIG. 2, the cumulative-time counter 11 stores therein package information for identifying the element package 3 or 4. Furthermore, the cumulative-time counter 11 stores therein element information for identifying any of the VCSELs 3a to 3d and 4a to 4d included in the element packages 3 and 4 and a cumulative operating time indicating the number of times each of the VCSELs 3a to 3d and 4a to 4d has output an optical signal, in an associated manner.

Here, package information "1" illustrated in FIG. 2 indicates the element package 3, and package information "2" illustrated in FIG. 2 indicates the element package 4. Furthermore, element information "1" associated with the package information "1" indicates the VCSEL 3a, and element information "2" associated with the package information "1" indicates the VCSEL 3b. And, element information "3" associated with the package information "1" indicates the VCSEL 3c, and element information "4" associated with the package information "1" indicates the VCSEL 3d.

Moreover, element information "1" associated with the package information "2" indicates the VCSEL 4a, and element information "2" associated with the package information "2" indicates the VCSEL 4b. And, element information "3" associated with the package information "2" indicates the VCSEL 4c, and element information "4" associated with the package information "2" indicates the VCSEL 4d.

Namely, in the example illustrated in FIG. 2, the cumulative-time counter 11 indicates that the VCSEL 3a has output an optical signal "6" times, and the VCSELs 3b to 3d have output an optical signal "5" times. Furthermore, in the example illustrated in FIG. 2, it is indicated that the VCSEL 4a has output an optical signal "1" time, the VCSEL 4b has output an optical signal "2" times, and the VCSELs 4c and 4d have not output any optical signal.

For example, when receiving a notification that the VCSEL 3b has output an optical signal from the link controller 13, the cumulative-time counter 11 updates the cumulative operating time "5", which has been stored in association with the element information 2 of the package information 1, to "6". Here, the link controller 13 notifies the cumulative-time counter 11 of a VCSEL that has transmitted an optical signal at a predetermined time interval. Consequently, the cumulative-time counter 11 counts a time when each of the VCSELs 3a to 3d and 4a to 4d has output an optical signal, i.e., a time when each of the VCSELs 3a to 3d and 4a to 4d was in operation.

Furthermore, when receiving a notification that any of the element packages 3 and 4 has been replaced from the link controller 13, the cumulative-time counter 11 updates the cumulative operating time stored in association with the notified element package to "0". For example, when receiving a notification that the element package 3 has been replaced, the cumulative-time counter 11 updates the cumulative operating time stored in association with the package information "1" to "0".

To return to FIG. 1, the connection selector switch 12 is a switch that assigns an electrical signal indicating information acquired from the CPU 2 to a VCSEL notified by the link controller 13. For example, when notified of the VCSELs 3b to 3d by the link controller 13, the connection selector switch 12 assigns an electrical signal indicating information output from the CPU 2 to the VCSELs 3b to 3d.

The link controller 13 measures a time when each of the VCSELs 3a to 3d and 4a to 4d has transmitted an optical signal. Then, the link controller 13 assigns an electrical signal indicating information to be transmitted from the CPU 2 to the HDD 6 to any of the VCSELs 3a to 3d and 4a to 4d according to the cumulative time when each of the VCSELs 3a to 3d and 4a to 4d has transmitted an optical signal.

A process performed by the link controller 13 is concretely explained below. First, the link controller 13 acquires a transmission quantity of information to be transmitted from the CPU 2 to the HDD 6 from the transmission-quantity monitoring unit 10. The link controller 13, then, calculates the number of optical links required for transmission of the notified transmission quantity of information.

Next, the link controller 13 acquires the number of times each of the VCSELs 3a to 3d and 4a to 4d has output an optical signal by referring to the cumulative-time counter 11. Then, the link controller 13 identifies a VCSEL of which the cumulative operating time is equal to or more than a predetermined threshold.

The link controller 13 sets the identified VCSEL as a non-use VCSEL, and identifies an element package including the non-use VCSEL. Incidentally, if there are more than one element package including the non-use VCSEL, the link controller 13 identifies an element package indicated by package information at the lowest number.

Furthermore, the link controller 13 identifies VCSELs other than the non-use VCSEL out of VCSELs included in the identified element package. Then, the link controller 13 selects as many VCSELs as the number of optical links required for transmission of the notified transmission quantity of information from the identified VCSELs in ascending order of the number of times of outputting an optical signal. Then, the link controller 13 notifies the cumulative-time counter 11, the connection selector switch 12, and the light-emitting-element control unit 14 of the selected VCSELs.

Incidentally, if the number of VCSELs selected from the identified element package is lower than the number of optical links required for transmission of the notified transmission quantity of information, the link controller 13 performs the following process. First, the link controller 13 selects VCSELs identified from the identified element package.

Then, the link controller 13 selects as many VCSELs as a shortage of VCSELs from VCSELs included in another element package in ascending order of the number of times of outputting an optical signal. Then, the link controller 13 notifies the cumulative-time counter 11, the connection selector switch 12, and the light-emitting-element control unit 14 of the selected VCSELs.

Incidentally, the link controller 13 performs the above-described process at a predetermined time interval. Namely, at the predetermined time interval, the link controller 13 acquires a transmission quantity of information to be transmitted from the transmission-quantity monitoring unit 10 and determines the number of optical links to be used. Then, the link controller 13 selects as many VCSELs as the determined number of optical links from VCSELs included in an element package including the non-use VCSEL in ascending order of the cumulative operating time.

After that, the link controller 13 notifies the cumulative-time counter 11, the connection selector switch 12, and the light-emitting-element control unit 14 of the selected VCSELs. Thus, at the predetermined time interval, the optical transmitter 1 selects VCSELs to be used and also updates the cumulative operating time of each of the VCSELs 3a to 3d and 4a to 4d.

Subsequently, an example of a process performed by the link controller 13 is explained. The explanation below is based on the assumption that the cumulative-time counter 11 has stored therein the information illustrated in FIG. 2. Furthermore, the link controller 13 sets a VCSEL that has output an optical signal "6" or more times as a non-use VCSEL.

For example, the link controller 13 determines that the number of optical links required for transmission of a transmission quantity of information notified by the transmission-quantity monitoring unit 10 is three. In such a case, the link controller 13 identifies the cumulative operating time of each of the VCSELs 3a to 3d and 4a to 4d by referring to the cumulative-time counter 11. Then, the link controller 13 determines the VCSEL 3a as a VCSEL of which the cumulative operating time is more than a predetermined threshold of "6", i.e., a non-use VCSEL.

Next, the link controller 13 selects the element package 3 including the VCSEL 3a. Then, the link controller 13 selects the three VCSELs 3b to 3d out of the VCSELs 3b to 3d which are VCSELs other than the non-use VCSEL included in the element package 3, in ascending order of the number of times of transmitting an optical signal. Then, the link controller 13 notifies the cumulative-time counter 11, the connection selector switch 12, and the light-emitting-element control unit 14 of the VCSELs 3b to 3d.

For another example, the link controller 13 determines that the number of optical links required for transmission of a transmission quantity of information notified by the transmission-quantity monitoring unit 10 is six. In such a case, the link controller 13 identifies the cumulative operating time of each of the VCSELs 3a to 3d and 4a to 4d by referring to the cumulative-time counter 11, and determines the VCSEL 3a as a non-use VCSEL.

Next, the link controller 13 selects the element package 3 including the VCSEL 3a determined as a non-use VCSEL. Here, the element package 3 includes only the three VCSELs 3b to 3d which are not the non-use VCSEL. Therefore, the link controller 13 selects the VCSELs 3b to 3d, and further selects as many VCSELs as a shortage of VCSELs from the VCSELs 4a to 4d included in the element package 4 in ascending order of the number of times of transmitting an optical signal.

In the example illustrated in FIG. 2, the link controller 13 selects the VCSELs 4a, 4c, and 4d. Then, the link controller 13 notifies the cumulative-time counter 11, the connection selector switch 12, and the light-emitting-element control unit 14 of the six VCSELs 3b to 3d, 4a, 4c, and 4d.

Incidentally, when any of the element packages 3 and 4 has been replaced, the link controller 13 notifies the cumulative-time counter 11 that the element package 3 or 4 has been replaced. For example, when the element package 3 has been replaced to a new package, the link controller 13 notifies the cumulative-time counter 11 that the element package 3 has been replaced.

The light-emitting-element control unit 14 supplies power to only a VCSEL that outputs an optical signal. Specifically, when receiving a notification of a VCSEL that outputs an optical signal from the link controller 13, the light-emitting-element control unit 14 supplies power to only the notified VCSEL and turns off the other VCSELs. For example, when receiving a notification of the VCSELs 4a, 4c, and 4d from the connection selector switch, the light-emitting-element control unit 14 supplies power to the VCSELs 4a, 4c, and 4d and turns off the other VCSELs 3a to 3d and 4b.

Incidentally, for example, the element package 3, the element package 4, the transmission-quantity monitoring unit 10, the cumulative-time counter 11, the connection selector switch 12, the link controller 13, and the light-emitting-element control unit 14 are electronic circuits. Here, as examples of the electronic circuits, integrated circuits, such as an application specific integrated circuit (ASIC) and a field programmable gate array (FPGA), or a central processing unit (CPU) and a micro processing unit (MPU), etc. are applied. Furthermore, the cumulative-time counter 11 can be a semiconductor memory storage device, such as a random access memory (RAM) or a flash memory.

Next, the flow of a process performed by the optical transmitter 1 is explained with reference to FIG. 3. FIG. 3 is a flowchart for explaining the flow of the process performed by the optical transmitter according to the first embodiment. In the example illustrated in FIG. 3, the optical transmitter 1 detects a transmission quantity of information to be transmitted from the CPU 2 to the HDD 6 (Step S101). Then, the optical transmitter 1 calculates the number of optical links required for transmission of the detected transmission quantity of information (Step S102).

Then, the optical transmitter 1 refers to the cumulative time when each of the VCSELs 3a to 3d and 4a to 4d has transmitted an optical signal, i.e., the cumulative operating time of each of the VCSELs 3a to 3d and 4a to 4d (Step S103). Then, the optical transmitter 1 performs a use-link determining process for determining a VCSEL that is used to transmit an optical signal according to the referenced cumulative operating time (Step S104).

Then, the optical transmitter 1 supplies power to the VCSEL that is used to transmit an optical signal by passing an electric current through the VCSEL (Step S105). Then, the optical transmitter 1 controls the connection selector switch 12 (Step S106) so that the connection selector switch 12 transmits an electrical signal indicating information output to be transmitted from the CPU 2 to the HDD 6 to the VCSEL that transmits an optical signal. Then, the optical transmitter 1 updates the cumulative operating time (Step S107), and again detects a transmission quantity of the information to be transmitted from the CPU 2 to the HDD 6 (Step S101).

Figure 4:
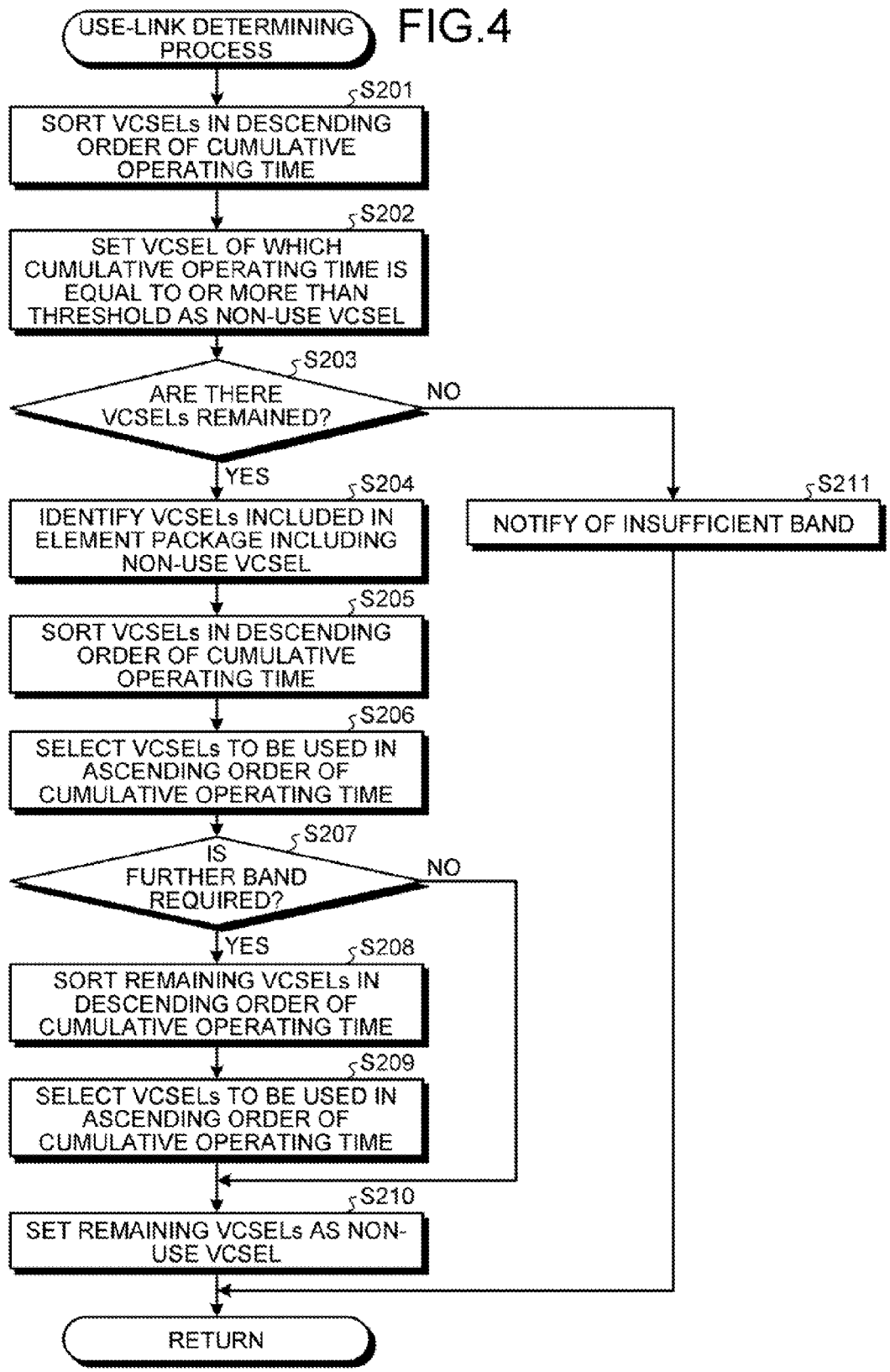
FIG. 4 is a flowchart for explaining the flow of a use-link determining process.

Next, an example of the use-link determining process performed by the optical transmitter 1 is explained with reference to FIG. 4. FIG. 4 is a flowchart for explaining the flow of the use-link determining process. Steps S201 to S207 illustrated in FIG. 4 correspond to Step S104 illustrated in FIG. 3, and the optical transmitter 1 performs the process illustrated in FIG. 4 upon referring to the cumulative operating time of each of the VCSELs 3a to 3d and 4a to 4d (Step S103).

For example, the optical transmitter 1 sorts the VCSELs 3a to 3d and 4a to 4d in descending order of the referred cumulative operating time (Step S201), and sets a VCSEL of which the cumulative operating time is equal to or more than a predetermined threshold as a non-use VCSEL (Step S202). Then, the optical transmitter 1 determines whether there remain as many VCSELs as the number of optical links calculated at Step S102 in FIG. 3 (Step S203).

Then, when determining that there remain as many VCSELs as the number of optical links calculated at Step S102 in FIG. 3 (YES at Step S203), the optical transmitter 1 identifies VCSELs included in an element package including the non-use VCSEL (Step S204). Then, the optical transmitter 1 sorts the identified VCSELs in descending order of the cumulative operating time (Step S205), and selects VCSELs to be used in ascending order of the cumulative operating time (Step S206).

Then, the optical transmitter 1 determines whether a further band is required (Step S207). Namely, the optical transmitter 1 determines whether as many VCSELs as the number of optical links required for transmission of information have been selected. Then, when determining that a further band is required (YES at Step S207), the optical transmitter 1 sorts the remaining VCSELs in descending order of the cumulative operating time (Step S208).

Then, the optical transmitter 1 selects as many VCSELs as a shortage of VCSELs in ascending order of the cumulative operating time (Step S209). After that, the optical transmitter 1 sets the remaining VCSELs not selected as a non-use VCSEL (Step S210), and the process ends. Incidentally, when, after selecting the VCSELs (Step S206), the optical transmitter 1 determines that the band is sufficient (NO at Step S207), the optical transmitter 1 sets the remaining VCSELs not selected as a non-use VCSEL (Step S210), and the process ends.

Furthermore, when the optical transmitter 1 determines that there are not as many VCSELs remained as the number of optical links calculated at Step S102 in FIG. 3 (NO at Step S203), the optical transmitter 1 transmits a notification of the insufficient band to the CPU 2 (Step S211), and the process ends. Incidentally, when receiving such a notification of the insufficient band, the CPU 2 waits for a predetermined period of time, and then retries to transmit the information again.

Effects of the Optical Transmitter 1

As described above, the optical transmitter 1 includes a plurality of VCSELs 3a to 3d and 4a to 4d that convert an electrical signal indicating information to be transmitted into an optical signal and transmit the converted optical signal. Furthermore, the optical transmitter 1 measures a time of transmission of an optical signal on each of the VCSELs 3a to 3d and 4a to 4d.

Then, the optical transmitter 1 assigns an electrical signal indicating information to be transmitted to a VCSEL other than a VCSEL of which the measured cumulative operating time is more than a predetermined threshold out of the VCSELs 3a to 3d and 4a to 4d. Namely, the optical transmitter 1 assigns an electrical signal indicating information to be transmitted to only a VCSEL of which the cumulative operating time is less than the predetermined threshold. Therefore, the optical transmitter 1 can enhance the reliability of optical interconnect without increasing the cost.

Namely, each time the VCSELs 3a to 3d and 4a to 4d transmit an optical signal, time-related deterioration progresses, resulting in a decrease in the reliability. Thus, the optical transmitter 1 determines that a VCSEL which has transmitted an optical signal for a longer time than the predetermined threshold is likely to have a breakdown resulting from progression of time-related deterioration.

The optical transmitter 1 does not assign an electrical signal to such a VCSEL of which the time of transmission of an optical signal is longer than the predetermined threshold, and assigns an electrical signal to only a VCSEL of which the time of transmission of an optical signal is shorter than the predetermined threshold and causes the VCSEL to transmit an optical signal. As a result, the optical transmitter 1 can avoid interruption of communication due to a link error resulting from a breakdown during the transmission of an optical signal, and therefore can enhance the reliability of optical interconnect.

Furthermore, even when inexpensive VCSELs for a consumer device are used as the VCSELs 3a to 3d and 4a to 4d, the optical transmitter 1 can perform communication using an optical signal without reducing the reliability. For example, optical devices for servers are required to have a continuous operating time of 100000 hours or more and the reliability of FIT (Failures in Time) of less than several hundred. On the other hand, optical devices for a consumer device including a VCSEL ensure a continuous operating time of about 10000 hours only, and the reliability is several thousand FIT. Therefore, the optical devices for a consumer device cannot be directly applied to optical interconnect for servers.

However, the optical transmitter 1 includes a plurality of VCSELs 3a to 3d and 4a to 4d, and does not use a VCSEL of which the cumulative operating time exceeds a predetermined threshold and assigns an electrical signal to only a VCSEL of which the cumulative operating time is equal to or less than the predetermined threshold. Consequently, the optical transmitter 1 avoids using a VCSEL in which a failure is likely to occur due to time-related deterioration; therefore, the optical transmitter 1 can reduce the probability of occurrence of an error in communication.

Namely, even when an optical device for a consumer device is applied to optical interconnect for servers, the optical transmitter 1 can retain the reliability expected of an optical device for servers; therefore, the optical transmitter 1 can enhance the reliability of optical interconnect without increasing the cost.

Furthermore, the optical transmitter 1 assigns an electrical signal to a VCSEL with the least cumulative operating time measured in one or more VCSELs other than a VCSEL with the cumulative operating time measured is more than a predetermined threshold. Thus, the optical transmitter 1 averages a time during which each of the VCSELs 3a to 3d and 4a to 4d outputs an optical signal; therefore, the time for replacement of each of the VCSELs 3a to 3d and 4a to 4d can be made to be near.

The link controller 13 determines the number of optical links required for transmission of a transmission quantity of information notified by the transmission-quantity monitoring unit 10. The link controller 13 selects an element package including a VCSEL considered to be broken due to time-related deterioration. Then, the link controller 13 selects as many VCSELs as the determined number of optical links from VCSELs included in the selected element package in ascending order of the cumulative time measured, and assigns an electrical signal to the selected VCSELs. Therefore, even when a transmission quantity of information to be transmitted is large and a plurality of optical links are required for the transmission, the optical transmitter 1 can select VCSELs appropriately.

Furthermore, the optical transmitter 1 identifies VCSELs included in an element package including a VCSEL of which the cumulative operating time exceeds a predetermined threshold, i.e., an element package to be replaced, and preferentially uses the identified VCSELs included in the element package. Namely, the optical transmitter 1 preferentially uses usable VCSELs included in an element package to be replaced; therefore, even when VCSELs are replaced by the element package, each of the VCSELs can be used efficiently.

Moreover, the optical transmitter 1 preferentially uses usable VCSELs included in an element package to be replaced; therefore, the optical transmitter 1 can reduce the use of VCSELs included in another element module. As a result, the optical transmitter 1 can reduce the running cost.

When there is a shortage of the band provided by VCSELs included in an identified element package, the link controller 13 selects the VCSELs included in the identified element package. Then, the link controller 13 selects VCSELs enough to cover the shortage from VCSELs included in another element package in ascending order of the cumulative time measured. Therefore, even when more optical links than the number of VCSELs included in an element package are required, the link controller 13 can average a time during which each of the VCSELs 3a to 3d and 4a to 4d transmits an optical signal.

The light-emitting-element control unit 14 turns off VCSELs not in operation; therefore, it is possible to prevent time-related deterioration of the VCSELs 3a to 3d and 4a to 4d and extend the life of the VCSELs 3a to 3d and 4a to 4d. As a result, the optical transmitter 1 can further enhance the reliability of optical interconnect.

[b] Second Embodiment

The embodiment according to the present invention is described above; the present invention can be embodied in various different forms other than the embodiment described above. The other embodiments included in the present invention are explained as a second embodiment below.

(1) Use-link Determining Process

The above-described optical transmitter 1 assigns an electrical signal to a VCSEL with less cumulative operating time. However, the present invention is not limited to this embodiment. An optical transmitter 1a that performs a different process from what that is performed by the optical transmitter 1 is explained below. For example, the optical transmitter 1a has the same functional configuration as the optical transmitter 1.

The optical transmitter 1a includes a link controller 13a that selects a VCSEL to which an electrical signal is to be transmitted using a different algorithm from that of the link controller 13. For example, the link controller 13a selects a VCSEL from VCSELs of which the cumulative operating time is less than a predetermined threshold in descending order of the cumulative operating time.

Specifically, when the link controller 13a selects a VCSEL from one element package, the link controller 13a selects VCSELs in ascending order of the cumulative operating time. Here, if there is a shortage of the band provided by VCSELs which can be selected from the element package, the link controller 13a can select further VCSELs from the other VCSELs in descending order of the cumulative operating time. An example of a process performed by the link controller 13a is explained below with reference to FIG. 5.

Figure 5:
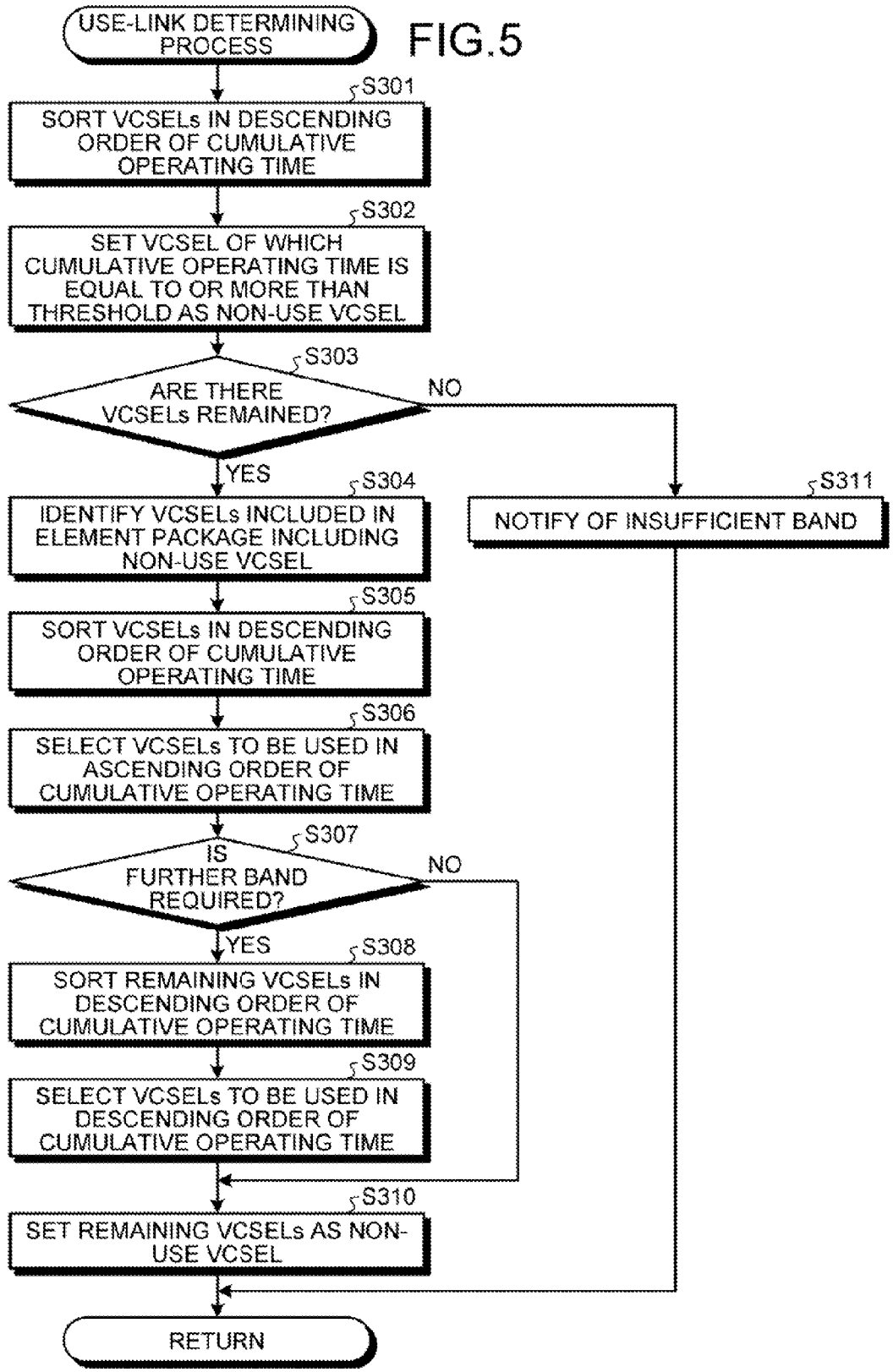
FIG. 5 is a flowchart for explaining a variation of the use-link determining process.

FIG. 5 is a flowchart for explaining a variation of the use-link determining process. Steps S301 to S308, S310, and S311 in the process illustrated in FIG. 5 are identical to Steps S201 to S208, S210, and S211 illustrated in FIG. 3, respectively, and description of these steps is omitted.

As illustrated in FIG. 5, the link controller 13a selects VCSELs in ascending order of the cumulative operating time (Step S306), and, when determining that a further band is required (YES at Step S307), the link controller 13a performs the following process. That is, the link controller 13a sorts the remaining VCSELs in descending order of the cumulative operating time (Step S308). Then, the link controller 13a selects a VCSEL to be used in descending order of the cumulative operating time (Step S309).

In this manner, when there is a shortage of the band provided by VCSELs included in an element package only, the link controller 13a performs the following process. That is, the link controller 13a selects a VCSEL to be used from VCSELs of which the cumulative operating time is less than a predetermined threshold from VCSELs included in another element package in descending order of the cumulative operating time. Therefore, the link controller 13a can concentrate VCSELs likely to be broken because of longer cumulative operating time into an element package. As a result, the optical transmitter 1a can prevent a VCSEL which is still usable from being replaced at the time of replacement of the element package 3 or 4.

(2) Control on each Element Package

The above-described optical transmitters 1 and 1a preferentially use VCSELs included in an element package including a non-use VCSEL, thereby preventing a VCSEL which is still usable from being replaced at the time of replacement of the element package 3 or 4. However, the present invention is not limited to this embodiment. For example, when the optical transmitters 1 and 1a include a plurality of VCSELs 3a to 3d and 4a to 4d not in the form of the element packages 3 and 4 but in a form in which each of the VCSELs can be replaced independently, the optical transmitters 1 and 1a can perform a process without taking into account the element packages 3 and 4.

Optical transmitters 1b and 1c that perform a different process from what that is performed by the optical transmitter 1 are explained below. For example, the optical transmitter 1b has the same functional configuration as the optical transmitter 1. Furthermore, the optical transmitter 1b includes a link controller 13b that selects a VCSEL to which an electrical signal is to be transmitted using a different algorithm from that of the link controller 13. For example, the link controller 13b selects a VCSEL from VCSELs of which the cumulative operating time is less than a predetermined threshold in ascending order of the cumulative operating time. Then, the link controller 13b assigns an electrical signal to the selected VCSEL.

Figure 6:
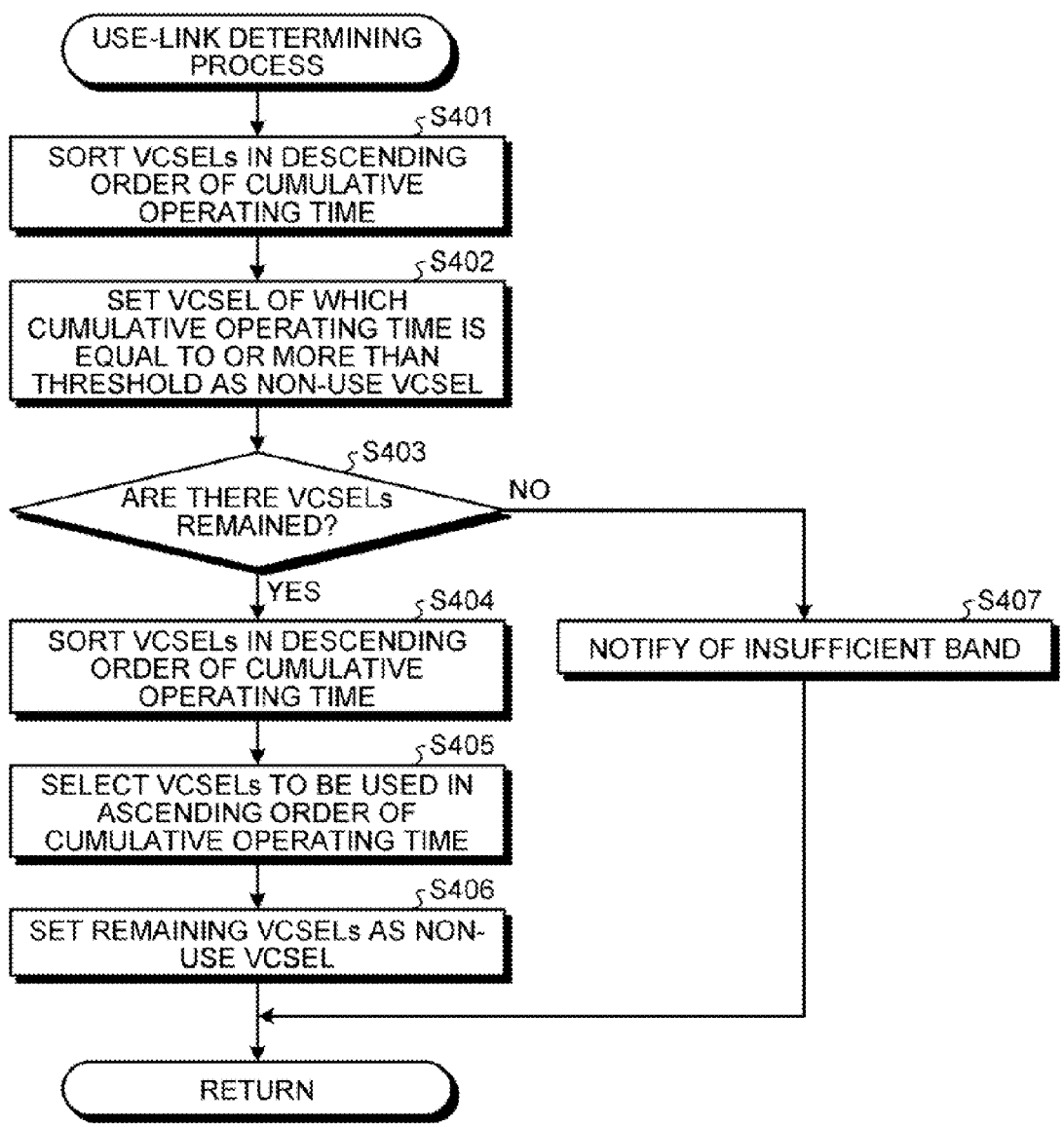
FIG. 6 is a first flowchart for explaining the flow of a use-link determining process without taking into account packages.

The flow of a process performed by the optical transmitter 1b is explained with reference to FIG. 6. FIG. 6 is a first flowchart for explaining the flow of a use-link determining process without taking into account the packages. The process illustrated in FIG. 6 is a process corresponding to Step S104 in FIG. 3. Namely, the optical transmitter 1b performs the process illustrated in FIG. 3 and the process illustrated in FIG. 6.

The optical transmitter 1b sorts the VCSELs 3a to 3d and 4a to 4d in descending order of the cumulative operating time by referring to the cumulative-time counter 11 (Step S401). Then, the optical transmitter 1b sets a VCSEL of which the cumulative operating time is equal to or more than a predetermined threshold as a non-use VCSEL (Step S402).

Then, the optical transmitter 1b determines whether there remain as many VCSELs as the number of optical links calculated at Step S102 in FIG. 3 (Step S403). When determining that there remain as many VCSELs as the number of optical links calculated at Step S102 in FIG. 3 (YES at Step S403), the optical transmitter 1b sorts the remaining VCSELs in descending order of the cumulative operating time (Step S404).

Then, the optical transmitter 1b selects VCSELs to be used in ascending order of the cumulative operating time (Step S405). Then, the optical transmitter 1b sets the remaining VCSELs not selected as a non-use VCSEL (Step S406), and the process ends. On the other hand, when determining that there are not as many VCSELs remained as the number of optical links calculated at Step S102 in FIG. 3 (NO at Step S403), the optical transmitter 1b transmits a notification of the insufficient band to the CPU 2 (Step S407), and the process ends.

In this manner, the optical transmitter 1b selects VCSELs to be used from the VCSELs 3a to 3d and 4a to 4d in descending order of the cumulative operating time without taking into account the packages. Therefore, the optical transmitter 1b can average the cumulative operating time of each of the VCSELs 3a to 3d and 4a to 4d. Namely, the optical transmitter 1b can make the degree of time-related deterioration of each VCSEL that transmits an optical signal to about the same degree. As a result, the optical transmitter 1b can enhance the reliability of optical interconnect.

Next, the optical transmitter 1c has the same functional configuration as the optical transmitter 1. Furthermore, the optical transmitter 1c includes a link controller 13c that selects a VCSEL to which an electrical signal is to be transmitted using a different algorithm from that of the link controller 13. The link controller 13c selects a VCSEL from VCSELs of which the cumulative operating time is less than a predetermined threshold in descending order of the cumulative operating time. Then, the link controller 13c assigns an electrical signal to the selected VCSEL.

Figure 7:
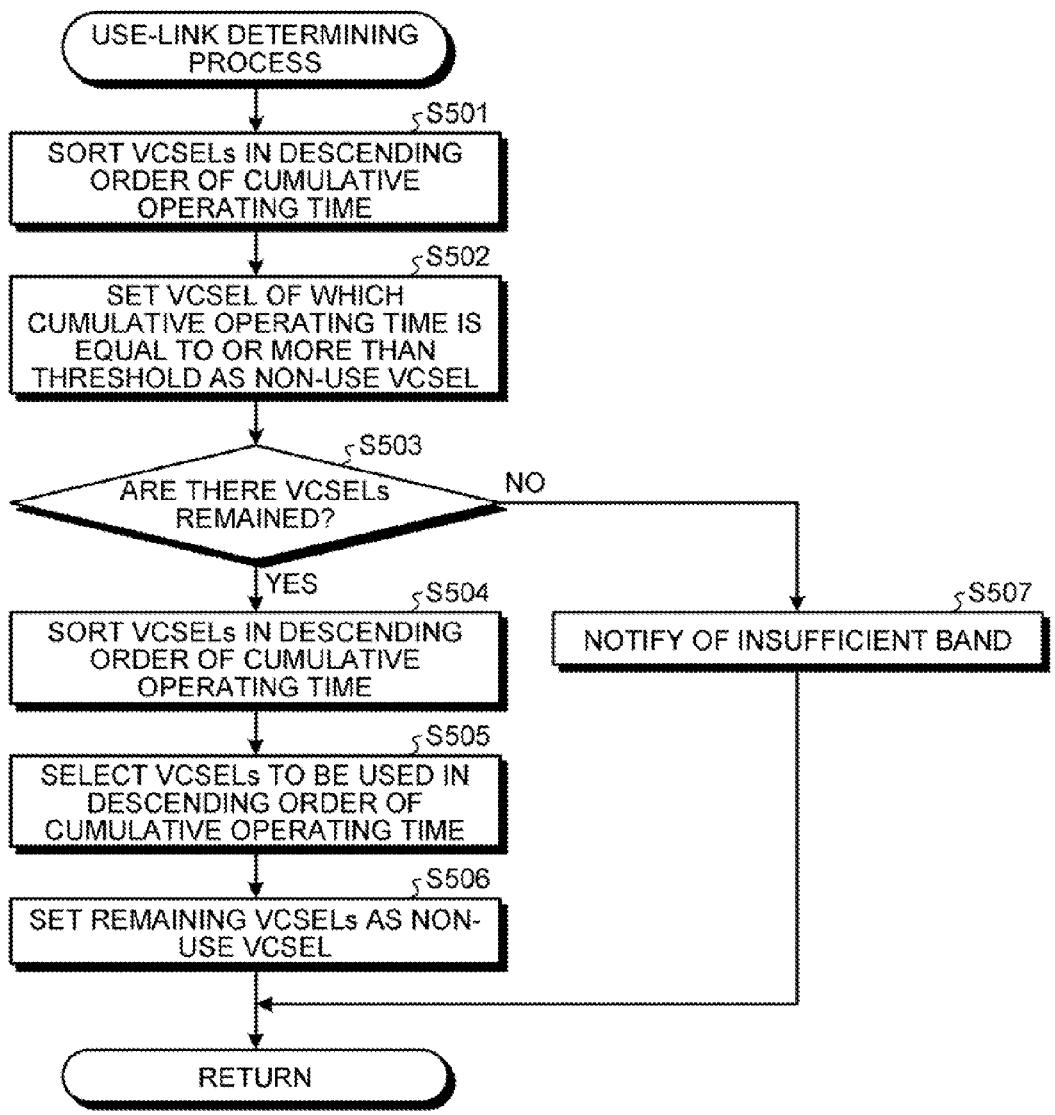
FIG. 7 is a second flowchart for explaining the flow of the use-link determining process without taking into account packages.

Here, the flow of a process performed by the optical transmitter 1c is explained with reference to FIG. 7. FIG. 7 is a second flowchart for explaining the flow of the use-link determining process without taking into account the packages. Steps S501 to S504, S506, and S507 in the process illustrated in FIG. 7 are identical to Steps S401 to S404, S406, and S407 in the process illustrated in FIG. 6, and description of these steps is omitted.

When determining that there remain as many VCSELs as the number of optical links calculated at Step S102 in FIG. 3 (YES at Step S503), the optical transmitter 1c sorts the remaining VCSELs in descending order of the cumulative operating time (Step S504). Then, the optical transmitter 1c selects VCSELs to be used from the remaining VCSELs in descending order of the cumulative operating time (Step S505). After that, the optical transmitter 1c sets VCSELs not selected as a non-use VCSEL (Step S506), and the process ends.

In this manner, the optical transmitter 1c selects VCSELs to be used from VCSELs of which the cumulative operating time is less than a predetermined threshold in the VCSELs 3a to 3d and 4a to 4d in descending order of the cumulative operating time. Therefore, the optical transmitter 1c can concentrate VCSELs that transmit an optical signal. As a result, the optical transmitter 1c can prevent a VCSEL which is still usable from being replaced, and also can enhance the reliability of optical interconnect.

(3) The Number of VCSELs to be Selected

The above-described optical transmitters 1 to 1c select as many VCSELs as a number corresponding to a transmission quantity of information to be transmitted. However, the present invention is not limited to this embodiment. For example, when a transmission quantity of information to be transmitted from the CPU 2 to the HDD 6 at a time is a transmission quantity possible for one optical link to transmit, the optical transmitters 1 to 1c select can select a VCSEL with the least cumulative operating time or a VCSEL with the most cumulative operating time.

For example, the optical transmitter 1 determines an element package including a VCSEL of which the cumulative operating time is more than a predetermined threshold without performing a process of determining the number of optical links required for transmission of information, i.e., the number of VCSELs to be used. Then, the optical transmitter 1 can select a VCSEL with the least cumulative operating time in VCSELs included in the determined element package. Furthermore, the optical transmitter 1b can select a VCSEL with the least cumulative operating time in all the VCSELs 3a to 3d and 4a to 4d each time the optical transmitter 1b acquires an electrical signal indicating information from the CPU 2. Moreover, the optical transmitter 1c can select a VCSEL with the most cumulative operating time in VCSELs of which the cumulative operating time is less than a predetermined threshold out of all the VCSELs 3a to 3d and 4a to 4d each time the optical transmitter 1c acquires an electrical signal indicating information from the CPU 2.

(4) Process of Selecting a VCSEL to be Used

The above-described optical transmitters 1 to 1c select a VCSEL to be used according to the cumulative operating time of each of the VCSELs 3a to 3d and 4a to 4d. However, the present invention is not limited to this embodiment. For example, the optical transmitters 1 to 1c store therein a VCSEL that has most recently transmitted an optical signal in addition to the cumulative operating time of each of the VCSELs 3a to 3d and 4a to 4d. Then, the optical transmitters 1 to 1c can set the VCSEL that has most recently transmitted an optical signal as a non-use VCSEL and select a VCSEL to be used from the remaining VCSELs.

Here, if a VCSEL from the VCSELs 3a to 3d and 4a to 4d continuously transmits an optical signal, this causes a rise in temperature, and the VCSEL deteriorates faster than a VCSEL that does not continuously transmit an optical signal. However, the optical transmitters 1 to 1c set a VCSEL that has most recently transmitted an optical signal as a non-use VCSEL and select a VCSEL to be used from the remaining VCSELs; therefore, each of the VCSELs 3a to 3d and 4a to 4d is prevented from transmitting an optical signal continuously.

Consequently, the optical transmitters 1 to 1c can further enhance the reliability of optical interconnect. Furthermore, even when VCSELs for a consumer device with lower reliability than that of VCSELs for servers are used, the optical transmitters 1 to 1c can operate properly; therefore, it is possible to reduce the cost.

(5) Light-emitting Element

The above-described optical transmitters 1 to 1c include the VCSELs 3a to 3d and 4a to 4d as a light-emitting element that transmits an optical signal. However, the present invention is not limited to this embodiment, and any element capable of converting an electrical signal into an optical signal using a technology, such as a semiconductor laser, can be applied.

(6) Configuration of Optical Transmitter

The functional configuration of the optical transmitter 1 explained with reference to FIG. 1 is just an example, and the optical transmitter can have another functional configuration enabling the optical transmitter to perform the same process. For example, in the example illustrated in FIG. 1, the transmission-quantity monitoring unit 10 acquires information to be transmitted, from a line connecting between the CPU 2 and the connection selector switch 12. However, for example, the transmission-quantity monitoring unit 10 can be configured to receive information transmitted from the CPU 2 and identify a transmission quantity of the information, and then output the information received from the CPU 2 to the connection selector switch 12.

According to one aspect of the invention, it is possible to enhance the reliability of optical interconnect.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmitter comprising:
a plurality of transmitting units that convert an electrical signal into an optical signal and transmit the converted optical signal;
a measuring unit that measures a time for each of the plurality of transmitting units of transmitting an optical signal; and
an assigning unit that assigns an electrical signal, indicating information to be transmitted, to one or more transmitting units, out of the plurality of transmitting units, other than a transmitting unit of which a cumulative time measured by the measuring unit is more than a predetermined threshold.

2. The optical transmitter according to claim 1, wherein the assigning unit assigns the electrical signal to a transmitting unit with the least cumulative time measured by the measuring unit out of the one or more transmitting units other than the transmitting unit of which the cumulative time measured by the measuring unit is more than the predetermined threshold.

3. The optical transmitter according to claim 1, further comprising a plurality of transmission modules that are replaceable and include the plurality of transmitting units, wherein
the assigning unit identifies a transmission module including a transmitting unit of which the cumulative time measured by the measuring unit exceeds the predetermined threshold, and assigns the electrical signal to a transmitting unit with the least cumulative time measured by the measuring unit out of transmitting units included in the identified transmission module.

4. The optical transmitter according to claim 3, wherein the assigning unit determines the number of transmitting units used for transmission of the information, and selects as many transmitting units as the determined number from the one or more transmitting units other than the transmitting unit of which the cumulative time measured by the measuring unit is more than the predetermined threshold in ascending order of the cumulative time measured by the measuring unit, and then assigns the electrical signal to the selected transmitting units.

5. The optical transmitter according to claim 4, wherein when the identified transmission module does not include as many transmitting units of which the cumulative time measured by the measuring unit is less than the predetermined threshold as the determined number, the assigning unit selects, in addition to the selected transmitting units, as many transmitting units as a shortage of the determined number from transmitting units included in another transmission module in ascending order of the cumulative time measured by the measuring unit, and assigns the electrical signal to the selected transmitting units.

6. The optical transmitter according to claim 4, wherein when the identified transmission module does not include as many transmitting units of which the cumulative time measured by the measuring unit is less than the predetermined threshold as the determined number, the assigning unit selects, in addition to the selected transmitting units, as many transmitting units as a shortage of the determined number from transmitting units of which the cumulative time measured by the measuring unit is less than the predetermined threshold included in another transmission module in descending order of the cumulative time measured by the measuring unit, and assigns the electrical signal to the selected transmitting units.

7. The optical transmitter according to claim 1, wherein the assigning unit assigns the electrical signal to a transmitting unit with the longest cumulative time measured by the measuring unit in the transmitting units of which the cumulative time measured by the measuring unit is less than the predetermined threshold.

8. The optical transmitter according to claim 1, further comprising a supplying unit that supplies power to the plurality of transmitting units, wherein the supplying unit supplies power to only the one or more transmitting units to which the electrical signal is assigned by the assigning unit.

9. An optical transmission method comprising:
measuring a time for each of a plurality of transmitting devices of transmitting an optical signal, the plurality of transmitting devices converting an electrical signal into an optical signal and transmitting the converted optical signal; and
assigning an electrical signal, indicating information to be transmitted, to one or more transmitting devices, out of the plurality of transmitting devices, other than a transmitting device of which a cumulative time measured is more than a predetermined threshold.

* * * * *